United States Patent [19]

Spencer et al.

[11] 4,084,835
[45] Apr. 18, 1978

[54] FRAME SAVER FOR LOGGING TRUCKS

[76] Inventors: Clark V. Spencer; Benjamin G. Rondeau, both of 6761 Monument Dr., Grants Pass, Oreg. 97526

[21] Appl. No.: 699,228

[22] Filed: Jun. 24, 1976

[51] Int. Cl.² ............................................. B62D 33/00
[52] U.S. Cl. .................................. 280/148; 105/380; 248/404
[58] Field of Search ............... 280/143, 144, 145, 148, ; 105/380, 411, 419; 248/404, 188.2, 188.5, 354 H

[56] References Cited

U.S. PATENT DOCUMENTS

| 405,819 | 6/1889 | Billings | 280/148 |
|---|---|---|---|
| 2,677,552 | 5/1954 | Dodds | 280/145 |
| 3,356,387 | 12/1967 | Skirvin | 280/145 |

FOREIGN PATENT DOCUMENTS 1,201,174  12/1959   France ............... 248/354 H

Primary Examiner—Joseph F. Peters, Jr.
Assistant Examiner—John A. Carroll
Attorney, Agent, or Firm—Clarence A. O'Brien; Harvey B. Jacobson

[57] ABSTRACT

A logging truck having a load supporting frame provided with a plurality of log-supporting bunks has a false bunk arrangement disposed over the load supporting center of a wheel assembly supporting the load supporting frame for applying a positive force to logs disposed on the bunks and relieving flexing of the load supporting frame.

7 Claims, 4 Drawing Figures

U.S. Patent    April 18, 1978    4,084,835
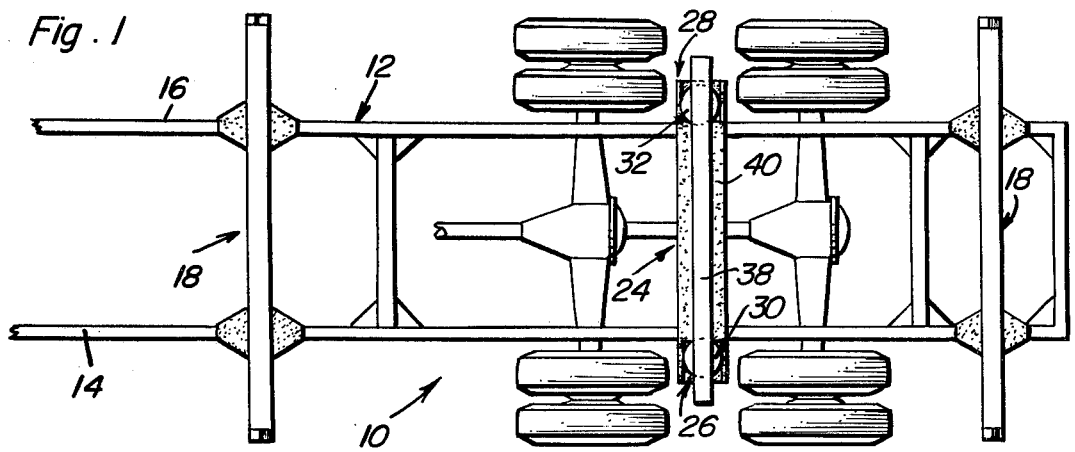
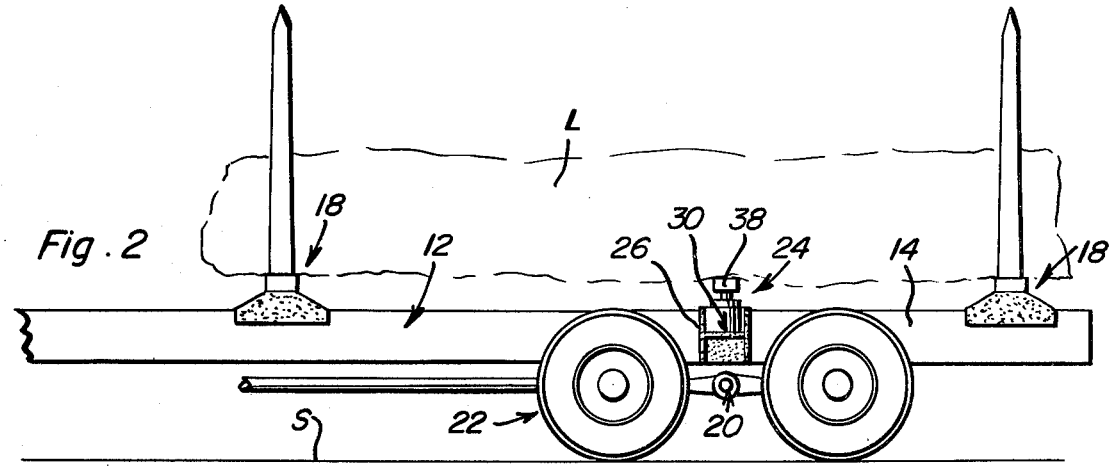
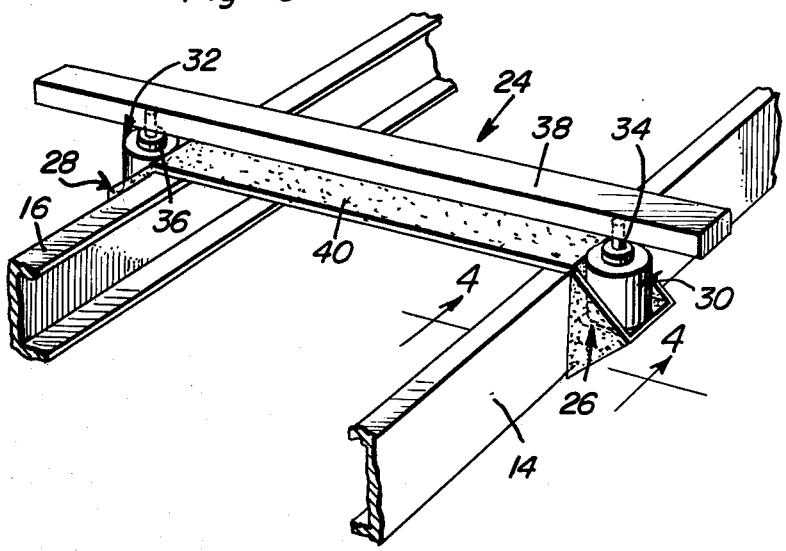
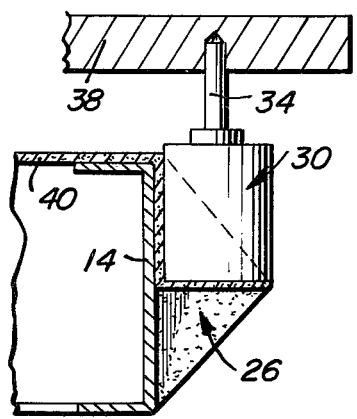

FRAME SAVER FOR LOGGING TRUCKS

BACKGROUND OF THE INVENTION

1. Field of the Invention

This invention relates generally to an arrangement for relieving the flexing commonly encountered in logging truck frames, and particularly to eliminating breakage of the frames of short logging trucks due to warping of the frame over the load center of the rear wheel assembly of the truck.

2. Description of the Prior Art

Logging trucks, and particularly those generally referred to as short log trucks, are frequently disabled by breakage of the frame due to repeated flexing of the frame because the log-supporting bunks attached to the frame are located forwardly and rearwardly of the wheels supporting the frame. The pressure being exerted down on the bunks warps the frame of the truck over the load supporting center of the wheel assembly, which in the case of a tandem wheel assembly is the location of the short shaft or trunnion. As a result, the steel and aluminum frames break in the trunnion area from the flexing.

While it is known to shift the load of trailer trucks, and the like, in order to equalize the load, such an approach will not work in the case of the short log trucks in particular, because the problem stems not from an unequal distribution of the load, but from the warping or flexing of the frame about a trunnion or other load supporting center of the rear wheel assembly of the truck. In any event, the short log trucks are single frame vehicles wherein the usual fifth-wheel arrangement employed with semi-trailer rigs for shifting a load cannot be employed.

SUMMARY OF THE INVENTION

It is an object of the present invention to provide a device for relieving the frame of short log trucks, and the like, from the detrimental flexing normally encountered by such trucks and other vehicles.

It is another object of the present invention to provide a device for placing a substantial portion of the load of a short log truck, and the like, directly over the trunnion or other load supporting center of the rear wheel assembly of the truck.

These and other objects are achieved according to the present invention by providing a false bunk arrangement disposed over the wheel assembly of the load carrying frame of a logging vehicle, and the like, for applying a positive force opposing the weight of logs or other articles being supported by bunks provided on the frame and relieving flexing of the frame in order to eliminate frame breakage and prolong life of the vehicle.

The false bunk arrangement preferably includes a pair of brackets mounted on outboard portions of side rails of the truck frame, with the brackets being disposed directly over the load supporting center of the associated rear wheel assembly of the truck. When the rear wheel assembly is a tandem wheel assembly, the brackets are disposed directly above the stub shaft or trunnion which supports the equalizer brackets of the wheel assembly.

The respective brackets mounted on the side rails of the frame are provided with fluid actuated cylinders each including a piston rod extending above the upper surface of the frame. A longitudinally extending false bunk is mounted on the piston rods and arranged extending transversely of the frame, or parallel to the bunks, for assuming part of the weight of logs on the bunks and relieving flexing of the frame when a suitable fluid pressure is applied to the cylinders and the piston rods of same are extended upwardly.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a fragmentary, top plan view showing a short log truck provided with a false bunk arrangement according to the present invention.

FIG. 2 is a schematic, side elevational view showing the truck of FIG. 1, but with a log shown resting on the bunks of the truck as well as the false bunk arrangement according to the invention.

FIG. 3 is a fragmentary, enlarged, perspective view showing the portion of the frame of the truck of FIGS. 1 and 2 in which the false bunk arrangement is disposed.

FIG. 4 is a fragmentary, enlarged, sectional view taken generally along the line 4—4 of FIG. 3.

DESCRIPTION OF THE PREFERRED EMBODIMENT

Referring now more particularly to the figures of the drawing, a short logging truck 10 is shown as including a frame 12 partially formed by a pair of substantially parallel, spaced side rails 14 and 16 on which a pair of longitudinally spaced bunks 18 are arranged for supporting logs such as the log designated L in FIG. 2. Supported directly beneath frame 12 near the rearward end thereof, that being the end to the right in FIGS. 1 and 2, are a pair of trunnions 20 (only one of which is shown) of a conventional tandem wheel assembly 22. Trunnions 20 are mounted on frame 12 as by conventional hangers (not shown) in order to support the equalizer brackets of assembly 22 in a manner well known and conventionally employed. Accordingly, the details of construction of tandem wheel assembly 22 will not be described in greater detail herein.

It will be understood that another wheel arrangement than the tandem wheel assembly 22 may be employed to support the rear end of frame 12, such as a conventional single axle set-up (not shown).

A false bunk arrangement 24 according to the invention is disposed over the wheel assembly 22, and more specifically over the trunnions 20, for applying a positive force opposing the weight of the logs being supported by bunks 18 and relieving flexing of frame 12 about the trunnions 20.

Arrangement 24 includes a pair of shelf-forming triangular-sided brackets 26 and 28 mounted directly on the side rails 14 and 16, as by welding, riveting, or bolting, at points directly over the trunnions 20. The arrangement 24 further includes a pair of fluid actuated cylinders 30 and 32 mounted on respective ones of the brackets 26 and 28 and each including a piston rod 34 and 36, respectively, extending above the upper surface of the rails 14 and 16 of frame 12. A longitudinally extending false bunk 38 is mounted on the upward free ends of piston rods 34 and 36 and arranged extending transverse of frame 12, or parallel to bunks 18, for assuming part of the weight of the logs on the bunks 18 and relieving flexing of frame 12 about trunnions 20. A suitable brace 40 is advantageously disposed connected to the brackets 26 and 28 for rigidifying the false bunk arrangement 24.

As can be readily appreciated from the figures of the drawing, the brackets 26 and 28 are mounted on the outside portions of rails 14 and 16 directly over the trunnions 20 to give an outrigger effect.

In operation, the fluid cylinders 30 and 32 can be pneumatic cylinders 8 inches in diameter and 6 inches in stroke, for example, with a lifting capacity of, say, approximately 5,500 pounds each at 110 pounds of air pressure. The pressure can be generated by the truck in a conventional manner, such as by attaching a conventional air compressor (not shown) to the drive train of the truck. When the piston rods 34 and 36 of the cylinders 30 and 32 are extended by application of adequate pressure to the cylinders 30 and 32, the false bunk 38 comes in contact with the bottom of a load of logs, and the like, as exemplified in FIG. 2 by the log L.

The trunnion 20 illustrates the weight balance of the truck 10. The payload is approximately, for example, 24,000 pounds on the truck bunks 18. There are conventional air and oil scales (not shown) mounted under bunks 18 next to frame 12 to weigh the load. The frame saver formed by the false bunk arrangement 24 is extended in a conventional manner after weighing of the load so as to assume, for example, 11,000 pounds of the total weight and relieve flexing of the frame 12.

As will be appreciated from the above description and from the drawing, the frame problem which occurs from pressure being exerted down on the bunks 18 so as to warp frame 12 over the trunnion 20 is eliminated by use of the false bunk arrangement 24. Thus, frame breakage will be virtually eliminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a log-hauling truck including a frame, a plurality of spaced bunks arranged on the frame for supporting logs, and a wheel assembly supporting the frame from a point between the bunks, the improvement comprising false bunk means disposed over the wheel assembly for applying a positive force opposing the weight of logs being supported by the bunks and relieving flexing of the frame; and bracket means for mounting the false bunk means on the frame directly over the wheel assembly, the false bunk means including, in combination:
   (a) a pair of fluid-actuated cylinders mounted on the bracket means and each including a piston rod extending above the frame; and
   (b) a longitudinally extending false bunk mounted on the piston rods and arranged extending transverse of the frame, parallel to the bunks, for assuming part of the weight of the logs on the bunk and relieving flexing of the frame, the frame including a pair of parallel, spaced side rails, with the bracket means including a pair of brackets mounted on the frame, one of the brackets to each of the side rails of the frame, the wheel assembly being a tandem wheel assembly including trunnions at the load supporting center of the assembly, with the brackets being disposed directly over the trunnions.

2. In a log-hauling truck including a frame, a plurality of spaced bunks arranged on the frame for supporting logs, and a wheel assembly supporting the frame from a point between the bunks, the improvement comprising false bunk means disposed over the wheel assembly for applying a positive force opposing the weight of logs being supported by the bunks and relieving flexing of the frame; and bracket means for mounting the false bunk means on the frame directly over the wheel assembly, the false bunk means including, in combination:
   (a) a pair of fluid-actuated cylinders mounted on the bracket means and each including a piston rod extending above the frame; and
   (b) a longitudinally extending false bunk mounted on the piston rods and arranged extending transverse of the frame, parallel to the bunks, for assuming part of the weight of the logs on the bunk and relieving flexing of the frame.

3. An improvement as set forth in claim 2, wherein the wheel assembly is a tandem wheel assembly including trunnions at load supporting centers of the assembly, with the false bunk means being disposed directly over the trunnions.

4. An improvement as set forth in claim 3, further including bracket means for mounting the false bunk means on the frame directly over the wheel assembly.

5. An improvement as set forth in claim 4, wherein the frame includes a pair of parallel, spaced side rails, with the bracket means including a pair of brackets mounted on the frame, one of the brackets to each of the side rails of the frame.

6. A method for relieving the flexing of a load supporting frame caused by moments applied to the frame by longitudinally extending articles supported at longitudinally spaced points on the frame and acting about a point of support of the frame, the point of support of the frame being arranged between the points of support of the longitudinally extending articles, comprising the steps of;
   (a) arranging longitudinally extending articles supported on and disposed extending between the longitudinally spaced points of the frame; and
   (b) applying a positive upward force to the longitudinally extending articles at a point between the longitudinally spaced points of support of the longitudinally extending articles.

7. A method as set forth in claim 6, wherein the applying step (b) includes the step of applying the upward force from directly above the point of support of the frame and causing the support for the frame to assume a portion of the weight of the load on the frame.

* * * * *